United States Patent
Phillips

(10) Patent No.: US 12,424,962 B2
(45) Date of Patent: Sep. 23, 2025

(54) PULSED ELECTRIC MACHINE CONTROL WITH SOFT START AND END

(71) Applicant: Tula eTechnology, Inc., San Jose, CA (US)

(72) Inventor: Andrew W. Phillips, Rochester, MI (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

(21) Appl. No.: 18/348,255

(22) Filed: Jul. 6, 2023

(65) Prior Publication Data

US 2024/0022200 A1    Jan. 18, 2024

Related U.S. Application Data

(63) Continuation of application No. PCT/US2023/026497, filed on Jun. 28, 2023, which is a continuation-in-part of application No. 18/305,776, filed on Apr. 24, 2023, now abandoned.

(60) Provisional application No. 63/390,196, filed on Jul. 18, 2022.

(51) Int. Cl.
  *H02P 27/08* (2006.01)
  *H02M 1/00* (2006.01)
  *H02M 1/36* (2007.01)

(52) U.S. Cl.
  CPC ........ *H02P 27/085* (2013.01); *H02M 1/0025* (2021.05); *H02M 1/36* (2013.01)

(58) Field of Classification Search
  CPC .... H02P 27/085; H02P 21/0089; H02P 21/20; H02M 1/0025; H02M 1/36
  See application file for complete search history.

(56) References Cited

U.S. PATENT DOCUMENTS

| | | |
|---|---|---|
| 4,441,043 A | 4/1984 | Decesare |
| 4,989,146 A | 1/1991 | Imajo |
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,731,669 A | 3/1998 | Shimizu et al. |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

International Search Report and Written Opinion dated Oct. 18, 2023 from International Application No. PCT/US2023/026497.

(Continued)

*Primary Examiner* — Rina I Duda
(74) *Attorney, Agent, or Firm* — Beyer Law Group LLP

(57) ABSTRACT

An electric machine controller arranged to direct a power converter to cause a pulsed operation of an electric machine in selected operational ranges to deliver a desired output and to cause a continuous operation of the electric machine in selected operational ranges is provided. A ramp generator is adapted to provide a ramping between the pulsed operation and the continuous operation.

24 Claims, 6 Drawing Sheets

(56) References Cited

U.S. PATENT DOCUMENTS

| | | | |
|---|---|---|---|
| 6,008,599 A * | 12/1999 | Beck | B62D 5/0463 |
| | | | 318/400.29 |
| 6,291,960 B1 | 9/2001 | Crombez | |
| 6,308,123 B1 | 10/2001 | Ikegaya et al. | |
| 6,370,049 B1 | 4/2002 | Heikkila | |
| 6,424,799 B1 | 7/2002 | Gilmore | |
| 6,479,956 B1 | 11/2002 | Kawabata et al. | |
| 6,493,204 B1 | 12/2002 | Glidden et al. | |
| 6,605,912 B1 | 8/2003 | Bharadwaj et al. | |
| 6,829,515 B2 | 12/2004 | Grimm | |
| 6,829,556 B2 | 12/2004 | Kumar | |
| 6,906,485 B2 | 6/2005 | Hussein | |
| 6,940,239 B2 | 9/2005 | Iwanaga et al. | |
| 7,084,603 B2 | 8/2006 | Taguchi et al. | |
| 7,190,143 B2 | 3/2007 | Wei et al. | |
| 7,259,664 B1 | 8/2007 | Cho et al. | |
| 7,327,545 B2 | 2/2008 | Konishi | |
| 7,411,801 B2 | 8/2008 | Welchko et al. | |
| 7,453,174 B1 | 11/2008 | Kalsi | |
| 7,498,792 B2 * | 3/2009 | Chang | H02M 3/158 |
| | | | 323/288 |
| 7,558,655 B2 | 7/2009 | Garg et al. | |
| 7,577,511 B1 | 8/2009 | Tripathi et al. | |
| 7,616,466 B2 | 11/2009 | Chakrabarti et al. | |
| 7,768,170 B2 | 8/2010 | Tatematsu et al. | |
| 7,835,887 B2 * | 11/2010 | Abbata | G05B 11/28 |
| | | | 358/413 |
| 7,852,029 B2 | 12/2010 | Kato et al. | |
| 7,960,888 B2 | 6/2011 | Ai et al. | |
| 7,969,341 B2 | 6/2011 | Robbe et al. | |
| 8,020,651 B2 | 9/2011 | Zillmer et al. | |
| 8,099,224 B2 | 1/2012 | Tripathi et al. | |
| 8,768,563 B2 | 7/2014 | Nitzberg et al. | |
| 8,773,063 B2 | 7/2014 | Nakata | |
| 9,046,559 B2 | 6/2015 | Lindsay et al. | |
| 9,050,894 B2 | 6/2015 | Banerjee et al. | |
| 9,308,822 B2 | 4/2016 | Matsuda | |
| 9,495,814 B2 | 11/2016 | Ramesh | |
| 9,512,794 B2 | 12/2016 | Serrano et al. | |
| 9,630,614 B1 | 4/2017 | Hill et al. | |
| 9,702,420 B2 | 7/2017 | Yoon | |
| 9,758,044 B2 | 9/2017 | Gale et al. | |
| 9,948,173 B1 | 4/2018 | Abu Qahouq | |
| 10,060,368 B2 | 8/2018 | Pirjaberi et al. | |
| 10,063,143 B1 * | 8/2018 | Fan | H02M 5/458 |
| 10,081,255 B2 | 9/2018 | Yamada et al. | |
| 10,256,680 B2 | 4/2019 | Hunstable | |
| 10,273,894 B2 | 4/2019 | Tripathi | |
| 10,291,168 B2 * | 5/2019 | Fukuta | H02P 27/085 |
| 10,291,174 B2 | 5/2019 | Irie et al. | |
| 10,320,249 B2 | 6/2019 | Okamoto et al. | |
| 10,333,403 B2 * | 6/2019 | Huang | H02M 3/158 |
| 10,340,821 B2 | 7/2019 | Magee et al. | |
| 10,344,692 B2 | 7/2019 | Nagashima et al. | |
| 10,381,968 B2 | 8/2019 | Agirman | |
| 10,447,160 B2 * | 10/2019 | Chen | H02M 3/158 |
| 10,476,421 B1 | 11/2019 | Khalil et al. | |
| 10,550,776 B1 | 2/2020 | Leone et al. | |
| 10,742,155 B2 | 8/2020 | Tripathi | |
| 10,763,772 B1 | 9/2020 | Fatemi et al. | |
| 10,944,352 B2 | 3/2021 | Mazda et al. | |
| 11,077,759 B1 | 8/2021 | Srinivasan | |
| 11,088,644 B1 | 8/2021 | Carvell | |
| 11,133,763 B1 | 9/2021 | Islam | |
| 11,133,767 B2 | 9/2021 | Serrano et al. | |
| 11,167,648 B1 | 11/2021 | Carvell et al. | |
| 11,228,272 B2 | 1/2022 | Tripathi | |
| 11,427,177 B2 | 8/2022 | Serrano et al. | |
| 11,623,529 B2 | 4/2023 | Carvell et al. | |
| 11,626,827 B2 | 4/2023 | Tripathi | |
| 11,628,730 B2 | 4/2023 | Srinivasan | |
| 11,695,361 B2 | 7/2023 | Carvell et al. | |
| 12,003,202 B2 | 6/2024 | Tripathi | |
| 2001/0039926 A1 | 11/2001 | Kobayashi et al. | |
| 2002/0043954 A1 | 4/2002 | Hallidy et al. | |
| 2005/0127861 A1 | 6/2005 | McMillan et al. | |
| 2005/0151437 A1 | 7/2005 | Ramu | |
| 2005/0160771 A1 | 7/2005 | Hosoito et al. | |
| 2007/0216345 A1 | 9/2007 | Kanamori | |
| 2007/0287594 A1 | 12/2007 | DeGeorge et al. | |
| 2008/0129243 A1 | 6/2008 | Nashiki | |
| 2008/0179980 A1 | 7/2008 | Dawsey et al. | |
| 2009/0045691 A1 | 2/2009 | Ichiyama | |
| 2009/0121669 A1 | 5/2009 | Hanada | |
| 2009/0128072 A1 | 5/2009 | Strong et al. | |
| 2009/0146615 A1 | 6/2009 | Zillmer et al. | |
| 2009/0179608 A1 | 7/2009 | Welchko et al. | |
| 2009/0306841 A1 | 12/2009 | Miwa et al. | |
| 2010/0010724 A1 | 1/2010 | Tripathi et al. | |
| 2010/0201294 A1 | 8/2010 | Yuuki et al. | |
| 2010/0296671 A1 | 11/2010 | Khoury et al. | |
| 2011/0029179 A1 | 2/2011 | Miyazaki et al. | |
| 2011/0089774 A1 | 4/2011 | Kramer | |
| 2011/0101812 A1 | 5/2011 | Finkle et al. | |
| 2011/0130916 A1 | 6/2011 | Mayer | |
| 2011/0208405 A1 | 8/2011 | Tripathi et al. | |
| 2012/0056569 A1 | 3/2012 | Takamatsu et al. | |
| 2012/0112674 A1 | 5/2012 | Schulz et al. | |
| 2012/0169263 A1 | 7/2012 | Gallegos-Lopez et al. | |
| 2012/0217916 A1 | 8/2012 | Wu et al. | |
| 2012/0217921 A1 | 8/2012 | Wu et al. | |
| 2013/0134912 A1 | 5/2013 | Khalil et al. | |
| 2013/0141027 A1 | 6/2013 | Nakata | |
| 2013/0226420 A1 | 8/2013 | Pedlar et al. | |
| 2013/0241445 A1 | 9/2013 | Tang | |
| 2013/0258734 A1 | 10/2013 | Nakano et al. | |
| 2014/0018988 A1 | 1/2014 | Kitano et al. | |
| 2014/0028225 A1 | 1/2014 | Takamatsu et al. | |
| 2014/0130506 A1 | 5/2014 | Gale et al. | |
| 2014/0176034 A1 | 6/2014 | Matsumura et al. | |
| 2014/0217940 A1 | 8/2014 | Kawamura | |
| 2014/0265957 A1 | 9/2014 | Hu et al. | |
| 2014/0292382 A1 * | 10/2014 | Ogawa | G01R 31/42 |
| | | | 327/124 |
| 2014/0354199 A1 | 12/2014 | Zeng et al. | |
| 2015/0025725 A1 | 1/2015 | Uchida | |
| 2015/0240404 A1 | 8/2015 | Kim et al. | |
| 2015/0246685 A1 * | 9/2015 | Dixon | B62D 5/0463 |
| | | | 701/42 |
| 2015/0261422 A1 | 9/2015 | Den et al. | |
| 2015/0297824 A1 | 10/2015 | Cabiri et al. | |
| 2015/0318803 A1 | 11/2015 | Wu et al. | |
| 2016/0114830 A1 | 4/2016 | Dixon et al. | |
| 2016/0226409 A1 | 8/2016 | Ogawa | |
| 2016/0233812 A1 | 8/2016 | Lee et al. | |
| 2016/0269225 A1 | 9/2016 | Kirchmeier et al. | |
| 2016/0373047 A1 | 12/2016 | Loken et al. | |
| 2017/0087990 A1 | 3/2017 | Neti et al. | |
| 2017/0163108 A1 | 6/2017 | Schencke et al. | |
| 2017/0331402 A1 | 11/2017 | Smith et al. | |
| 2018/0032047 A1 | 2/2018 | Nishizono et al. | |
| 2018/0045771 A1 | 2/2018 | Kim et al. | |
| 2018/0154786 A1 | 6/2018 | Wang et al. | |
| 2018/0276913 A1 | 9/2018 | Garcia et al. | |
| 2018/0323665 A1 | 11/2018 | Chen et al. | |
| 2018/0334038 A1 | 11/2018 | Zhao et al. | |
| 2019/0058374 A1 | 2/2019 | Enomoto et al. | |
| 2019/0267919 A1 | 8/2019 | Suzuki et al. | |
| 2019/0288629 A1 * | 9/2019 | Tripathi | H03M 3/438 |
| 2019/0288631 A1 * | 9/2019 | Tripathi | H02P 6/10 |
| 2019/0341820 A1 | 11/2019 | Krizan et al. | |
| 2020/0212834 A1 | 7/2020 | Mazda et al. | |
| 2020/0262398 A1 | 8/2020 | Sato et al. | |
| 2020/0328714 A1 | 10/2020 | Tripathi | |
| 2020/0343849 A1 | 10/2020 | Coroban-Schramel | |
| 2020/0366223 A1 | 11/2020 | Coroban-Schramel | |
| 2021/0146909 A1 | 5/2021 | Serrano et al. | |
| 2021/0203263 A1 | 7/2021 | Serrano et al. | |
| 2021/0351733 A1 | 11/2021 | Carvell | |
| 2022/0234451 A1 | 7/2022 | Srinivasan | |
| 2022/0416707 A1 | 12/2022 | Chen | |
| 2023/0114289 A1 | 4/2023 | Islam et al. | |
| 2023/0219426 A1 | 7/2023 | Carvell et al. | |
| 2023/0283211 A1 | 9/2023 | Carvell | |

(56) References Cited

U.S. PATENT DOCUMENTS

| | | |
|---|---|---|
| 2024/0022191 A1 | 1/2024 | Phillips et al. |
| 2024/0136968 A1 | 4/2024 | Mazda |
| 2024/0291410 A1 | 8/2024 | Carvell et al. |
| 2024/0291416 A1 | 8/2024 | Tripathi |
| 2024/0364250 A1 | 10/2024 | Carvell |
| 2024/0372489 A1 | 11/2024 | Srinivasan |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | H05153705 | 6/1993 |
| JP | 10243680 | 9/1998 |
| JP | 2000-037089 | 2/2000 |
| JP | 2004-343833 | 12/2004 |
| JP | 2008-079686 A | 4/2008 |
| JP | 2009-065758 A | 3/2009 |
| JP | 2011-67043 | 3/2011 |
| JP | 2012-228134 | 11/2012 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2020048254 A | 3/2020 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |
| WO | WO 2015-092033 | 6/2015 |

OTHER PUBLICATIONS

Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.
Cai et al., "Torque Ripple Reduction for Switched Reluctance Motor with Optimized PWM Control Strategy", https://www.mdpi.com/1996-1073/11/11/3215, Oct. 15, 2018, 27 pages.
Spong et al., "Feedback Linearizing Control of Switched Reluctance Motors", IEEE Transactions on Automatic Control, vol. AC-32, No. 5, May 1987, pp. 371-379.
Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.
Luckjiff et al., "Hexagonal ΣΔModulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.
Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.
Islam, U.S. Appl. No. 18/165,100, filed Feb. 6, 2023.
Farah et al., U.S. Appl. No. 18/184,569, filed Mar. 15, 2023.
Phillips, U.S. Appl. No. 18/305,776, filed Apr. 24, 2023.

* cited by examiner

PULSED ELECTRIC MACHINE CONTROL WITH SOFT START AND END

CROSS-REFERENCE TO RELATED APPLICATION

This application is a Continuation of International Application No. PCT/US23/026497, filed on Jun. 28, 2023, which is a Continuation-in-Part of U.S. application Ser. No. 18/305,776, filed on Apr. 24, 2023 and claims the benefit of priority of U.S. Application No. 63/390,196, filed Jul. 18, 2022, all of which are incorporated herein by reference for all purposes.

BACKGROUND

The present application relates generally to electric machine control. More specifically, control schemes and controller designs are described that pulse the operation of an electric machine during selected operating conditions to facilitate operating the electric machine in a more energy efficient manner with reduced noise, vibration, and harshness (NVH).

SUMMARY

A variety of methods, controllers, and electric machine systems are described that facilitate pulsed control of a multiple electric machine (e.g., electric motors and generators) drive system to improve the energy conversion efficiency of the electric machines when operating conditions warrant. More specifically, an electric machine controller arranged to direct a power converter to cause a pulsed operation of an electric machine in selected operational ranges to deliver a desired output and to cause a continuous operation of the electric machine in selected operational ranges is provided. A ramp generator is adapted to provide a ramping between the pulsed operation and the continuous operation.

In another embodiment, a system is provided where the system comprises an electric machine, a power converter, and an electric machine controller. The electric machine controller is arranged to direct the power converter to cause a pulsed operation of the electric machine in selected operational ranges to deliver a desired output and to cause a continuous operation of the electric machine in selected operational ranges, wherein the electric machine controller comprises a ramp generator adapted to provide a ramping between the pulsed operation and the continuous operation.

In another embodiment, a method for controlling an electric machine by an electric machine controller arranged to direct a power converter to cause a pulsed operation of the electric machine in selected operational ranges to deliver a desired output and to cause a continuous operation of the electric machine in selected operational ranges is provided. A ramping between the pulsed operation and the continuous operation is provided.

These and other features of the present disclosure will be described in more detail below in the detailed description of the disclosure and in conjunction with the following figures.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present application relates to pulsed control of a wide variety of electric machines (e.g., electric motors and generators) that would otherwise be operated in a continuous manner. Pulsed electric machine control is described in U.S. Pat. No. 10,742,155 (P200B); U.S. Pat. No. 10,944,352 (P201); U.S. Pat. No. 11,077,759 (P208C1); U.S. Pat. No. 11,088,644 (P207C1); U.S. Pat. No. 11,133,767 (P204X1); U.S. Pat. No. 11,167,648 (P205); and U.S. Pat. No. 11,228,272 (P200C). Each of the foregoing applications is incorporated herein by reference in its entirety. As described in the incorporated applications, pulsed control of an electric machine offers the advantage of improving the operational energy conversion efficiency of the machine The phrase "electric machine" as used herein is intended to be broadly construed to mean both electric motors and generators. Electric motors and generators are structurally very similar. When an electric machine is operating as a motor, it converts electrical energy into mechanical energy. When operating as a generator, the electric machine converts mechanical energy into electrical energy.

Figure 1:
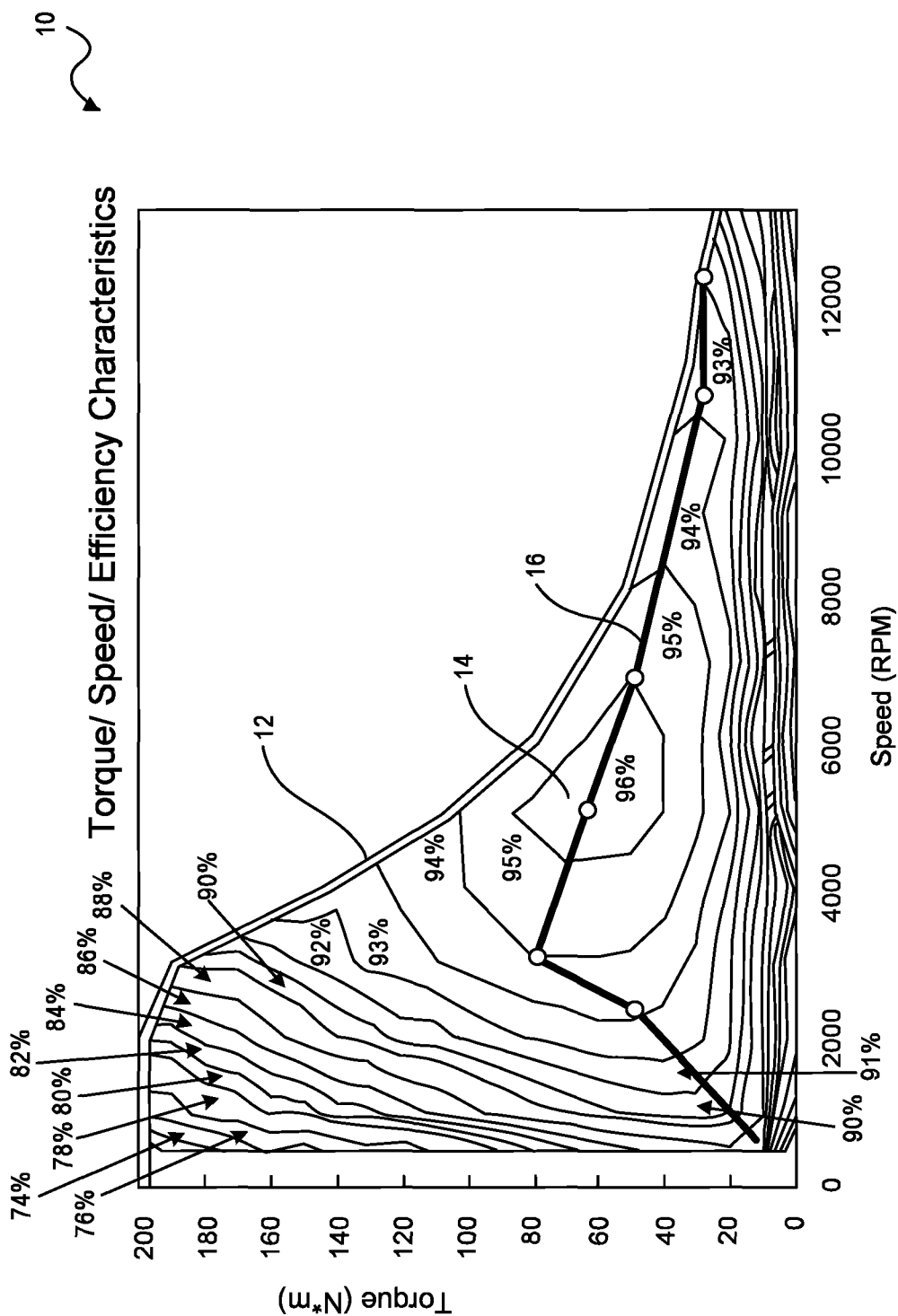
FIG. 1 is a representative Torque/Speed/Efficiency graph illustrating the energy conversion efficiency of a representative electric motor under different operating conditions.

Electric motors and generators are used in a very wide variety of applications and under a wide variety of operating conditions. In general, many modern electric machines have relatively high energy conversion efficiencies, however, the energy conversion efficiency of most electric machines can vary considerably based on their operational load. Many applications require that the electric machine operates under a wide variety of different operating load conditions, which means that the electric machine often does not operate as efficiently as it is capable of. The nature of this problem is illustrated in FIG. 1, which is a motor efficiency map 10 that diagrammatically shows the efficiency of a representative motor under different operating conditions. More specifically, the figure plots the energy conversion efficiency of the motor as a function of motor speed (the X-axis) and torque generated (the Y-axis).

As can be seen in FIG. 1, the illustrated motor is generally most efficient when it is operating within a particular speed range and generating torque within a defined range 12. For the particular motor shown, the most efficient region of its operating range is the operating region labeled 14 which is generally in the range of 4500-6000 rotations per minute (RPM) with a torque output in the range of about 40-70 Nm where its energy conversion efficiency is approximately 96%. The region 14 is sometimes referred to herein as the "sweet spot", which is simply the motor's most efficient operating region.

As can be seen in FIG. 1, at any particular motor speed, there will be a corresponding most efficient output torque which is diagrammatically illustrated by maximum efficiency curve 16. For any given motor speed, the motor's efficiency tends to drop off somewhat when the motor's load is higher or lower than the most efficient load. In some regions, the motor's efficiency tends to drop relatively quickly, for example when the torque output falls below about 30 Nm in the illustrated motor.

If the operating conditions could be controlled so that the motor is almost always operated at or near its sweet spot, the energy conversion efficiency of the motor would be quite good. However, many applications require that the motor operates over a wide variety of load conditions with widely varying torque requirements and widely varying motor speeds. One such application that is easy to visualize is automotive and other vehicle or mobility applications where the motor speed may vary between zero when the vehicle is stopped to a relatively high RPM when cruising at highway speeds. The torque requirements may also vary widely at any of those speeds based on factors such as whether the vehicle is accelerating or decelerating, going uphill, downhill, going on relatively flat terrain, etc., the weight of the vehicle, and many other factors. Of course, motors used in other applications may be subjected to a wide variety of operating conditions as well.

Although the energy conversion efficiency of conventional electric machines is generally good, there are continuing efforts to further improve energy conversion efficiencies over broader ranges of operating conditions.

The present disclosure relates generally to pulsed control of electric machines (e.g., electric motors and generators) that would otherwise be operated in a continuous manner to improve the energy conversion efficiency of the electric machine when operating conditions warrant. More specifically, under selected operating conditions, an electric machine is intermittently driven (pulsed) at more efficient energy conversion operating levels to deliver a desired average torque more energy efficiently than would be attained by traditional continuous motor control.

Many types of electrical machines, including mechanically commutated machines, electronically commutated machines, externally commutated asynchronous machines, and externally commutated synchronous machines are traditionally driven by a continuous, albeit potentially varying, drive current when the machine is used as a motor to deliver a desired torque output. The drive current is frequently controlled by controlling the output voltage of a power converter (e.g., an inverter) which serves as the voltage input to the motor. Conversely, the power output of many types of generators is controlled by controlling the strength of a magnetic field—which may, for example, be accomplished by controlling an excitation current supplied to rotor coils by an exciter. (The exciter may be part of a rectifier or other suitable component). Regardless of the type of machine, the drive current for a motor, or the current output by a generator, tends to be continuous. The continuous drive current output may be a continuous direct current (DC) or continuous alternating current (AC).

With pulsed control, the output of the machine is intelligently and intermittently modulated between different torque levels in a manner that: (1) meets operational demands, while (2) improving overall efficiency. Stated differently, under selected operational ranges, the electric machine is intermittently driven at more efficient energy conversion operating levels than would be available if the electric machine be driven in a continuous and steady manner to deliver a desired output.

As previously discussed, FIG. 1 illustrates the energy conversion efficiency of a representative motor. The map illustrated in FIG. 1 is the efficiency map for an internal permanent magnet synchronous motor used in a 2010 Toyota Prius. It should be understood that this map is merely illustrative. Similar efficiency maps can be generated for just about any electric machine although the characteristics of the map will vary with the machine that is characterized.

As can be seen in FIG. 1, at any particular motor speed, there will be a corresponding most efficient output torque which is diagrammatically illustrated by maximum efficiency curve 16. From a conceptual standpoint, when the desired motor torque is below the most efficient output torque for the current motor speed, the overall efficiency of the motor can be improved by pulsing the motor. Conversely, when the desired motor torque is at or above the maximum efficiency curve 16, the motor may be operated in a conventional (continuous/non-pulsed) manner to deliver the desired torque.

Figure 2A:
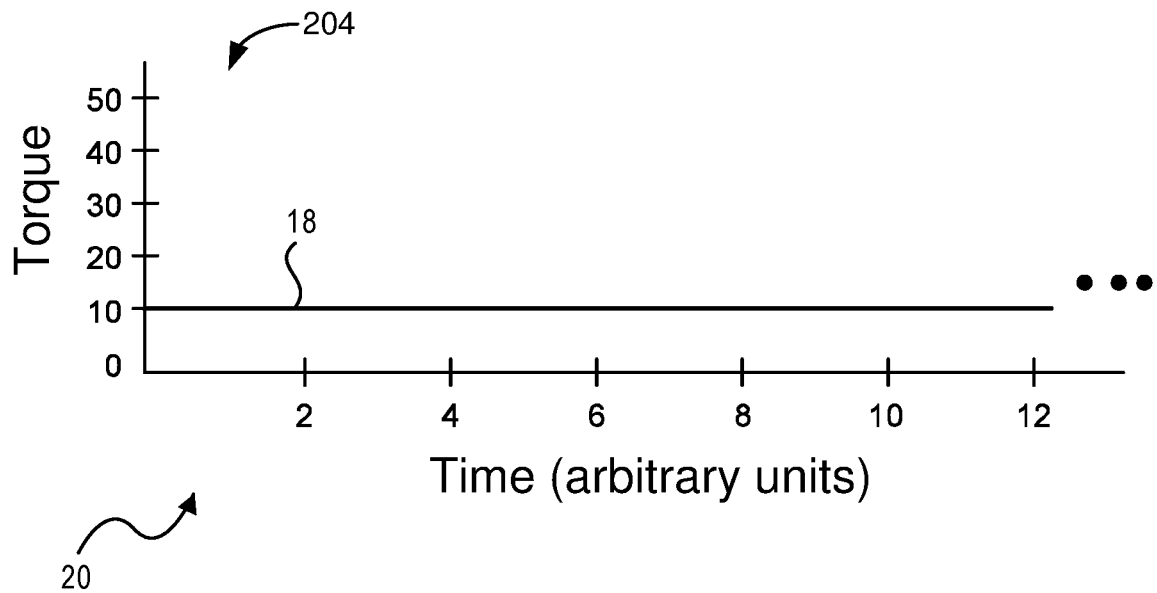
FIG. 2A illustrates an example of a continuous motor operation.

FIG. 2A illustrates an example of a continuous motor operation. In this particular example, the desired motor torque is 10 Nm is provided by a continuous output 18 at 10 Nm.

Figure 2B:
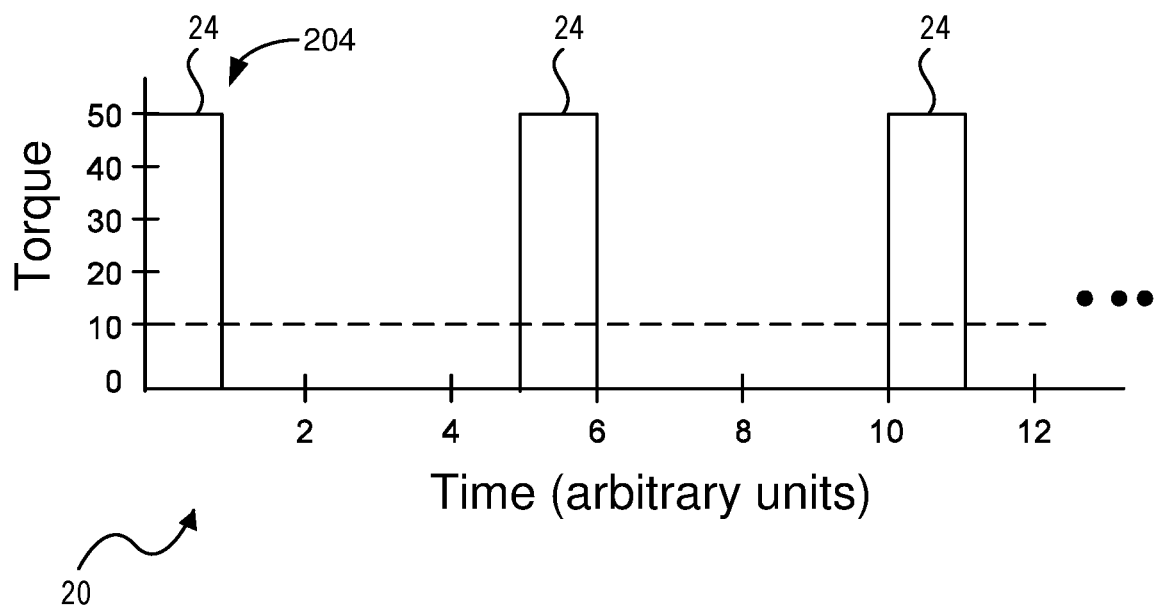
FIG. 2B illustrates an example of a pulsed motor operation.

FIG. 2B illustrates an example of a pulsed motor operation. This example is described in U.S. Pat. No. 10,742,155, issued Aug. 11, 2020, to Adya S. Tripathi, which is incorporated by reference for all purposes. In this particular example, the desired motor torque is 10 Nm, but the most efficient torque output for the current operating motor speed is 50 Nm. Conceptually, the motor can be driven to deliver a net torque of 10 Nm (labeled 24) by causing the motor to deliver 50 Nm of torque for 20% of the time and then delivering no (zero) torque for the remaining 80% of the time. Since the motor operates more efficiently when it is delivering 50 Nm than when it delivers 10 Nm, the motor's overall efficiency can be improved by pulsing the motor's operation in the described manner. In the example illustrated in FIG. 2, the motor produces a torque pulse pattern 204 to provide a motor output of 50 Nm (labeled 24) for a period of 1 time unit out of every 5 time units, and then the motor is controlled to produce zero torque during the intervening 4 time units.

As long as the desired motor output does not exceed 50 Nm, the desired motor output can theoretically be met merely by changing the duty cycle of the motor operating at 50 Nm. For example, if the desired motor output changes to 20 Nm, the duty cycle of the motor operating at 50 Nm can be increased to 40%; if the desired motor output changes to 40 Nm, the duty cycle can be increased to 80%; if the desired motor output changes to 5 Nm, the duty cycle can be reduced to 10% and so on. More generally, pulsing the motor can potentially be used advantageously any time that the desired motor torque falls below the maximum efficiency curve 16.

The scale of the time units used may vary widely based on the size, nature, and design needs of any particular system. In practice, when the motor is switched from the "torque on" to "zero torque" states relatively rapidly to achieve the designated duty cycle, the fact that the motor is being switched back and forth between these states may not materially degrade the motor's performance from an operational standpoint. In some embodiments, the scale of the periods for each on/off cycle is expected to be on the order of 100 psec to 0.10 seconds (i.e., pulsing at a frequency in the range of 10 to 10,000 Hz), as for example in the range of 20 to 1000 Hz, or 20 to 100 Hz as will be discussed in more detail below.

The zero torque portions of the pulse cycle might conceptually be viewed as shutting the motor off—although in many cases the motor may not be shut off during those periods or may be shut off for only portions of the "zero torque" intervals.

Figure 3:
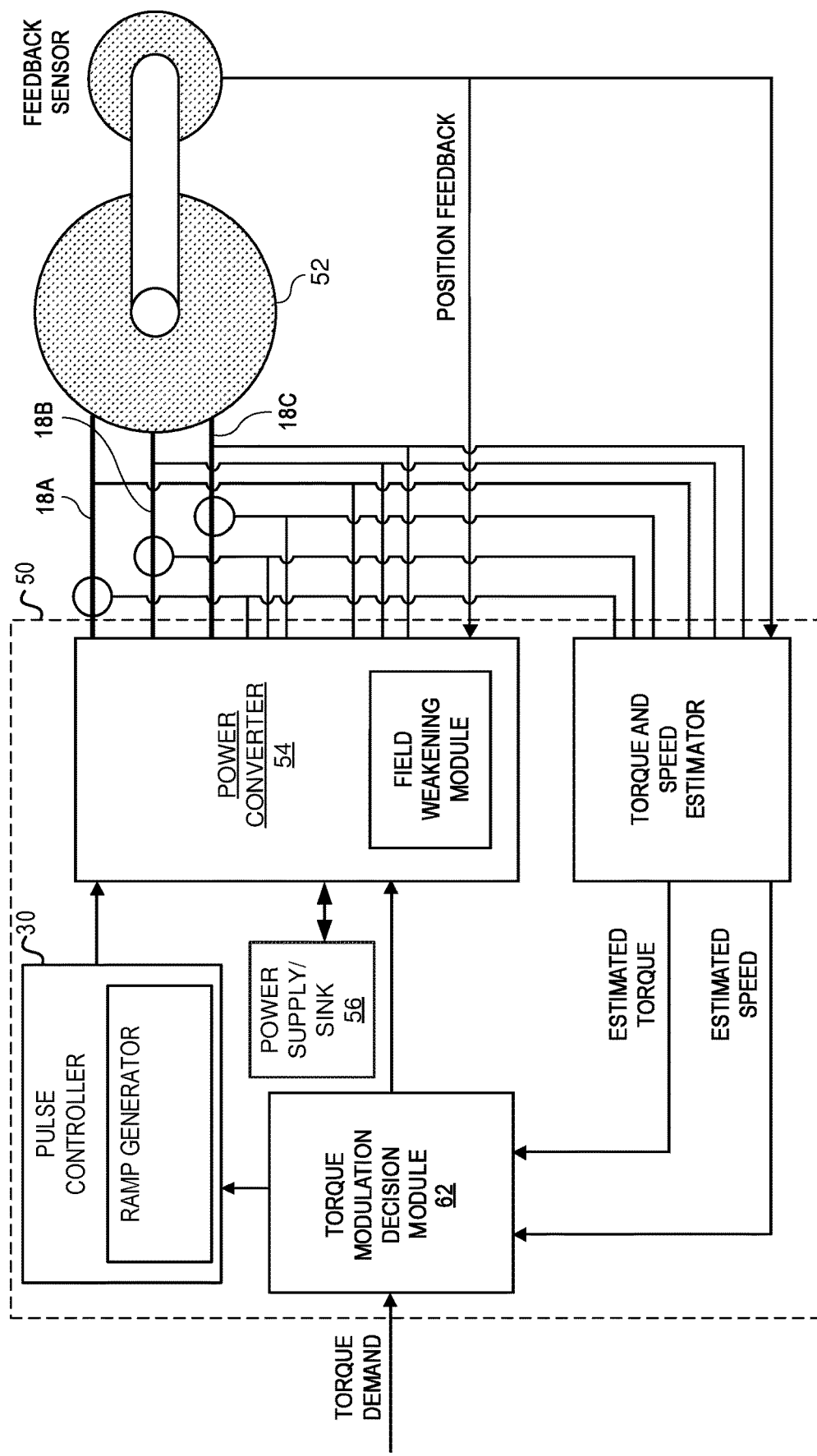
FIG. 3 is a functional block diagram that diagrammatically illustrates an electric machine controller with one described embodiment.

FIG. 3 is a block diagram illustrating a system having an electric machine controller 50 that enables pulsed operation of an electric machine 52 that may be used in some embodiments. The electric machine 52 may be any type of electric machine, including induction motors/machines, permanent magnet assisted synchronous reluctance machines, interior permanent magnet (IPM) machines, and others. The illustrated electric machine 52 is a three-phase electric machine although it should be appreciated that the electric machine may be designed to utilize any desired number of phases including just a single phase.

The electric machine controller 50 includes a power converter 54, a pulse controller 30, and a torque control decision module 62. The pulsed controller 30 has a ramp generator The power converter 54 may be operated as a power inverter or power rectifier depending on the direction of energy flow through the system.

When the electric machine 52 is operated as a motor, the power converter 54 is responsible for generating three-phase AC power (denoted as 18A, 18B, and 18C for phases A, B, and C respectively) from the DC power supply/sink 56. Three-phase AC power in this example is provided by three power signals with the same amplitude and frequency, but 120° out of phase from each other. The three-phased input power is applied to the windings of the stator of the electric machine 52 for generating a Rotating Magnetic Force (RMF). In an induction motor, this rotation field induces current to flow in the rotor winding which in turn induces a rotor magnetic field. The interaction of the rotor and stator magnetic fields generates an electromagnetic force (EMF) causing rotation of the rotor, which in turn rotates a motor shaft. The rotating shaft provides the output torque of the motor. For most common permanent magnetic motors, the rotor field is that of the permanent magnet.

The three phases, 18A-18C are each depicted by lines with arrows on both ends indicating that current can flow in either direction. When used as a motor, current flows from the power supply/sink 56, through the power converter 54, to the electric machine 52. When used as a generator, the current flows from the electric machine 52, through the power converter 54, to the power supply/sink 56. When operating as a generator, the power converter 54 essentially operates as a power rectifier, and the AC power coming from the electric machine 52 is converted to DC power being stored in the DC power supply, such as a battery or capacitor.

The pulse controller 30 is responsible for selectively pulsing the three-phased input current 18A-18C to the electric machine 52. During conventional (i.e., continuous) operation, the three-phased input current provided to the electric machine 52 are continuous sinusoidal current signals, each signal 120° degrees out of phase with respect to one another. In this example, when the electric machine 52 is in sync with the three-phase AC power, the frequency of each signal of the three-phase AC power is equal to the frequency of rotation of the motor shaft and the amplitude of the signals of the three-phase AC power is related to the torque provided by the motor shaft.

Figure 4:
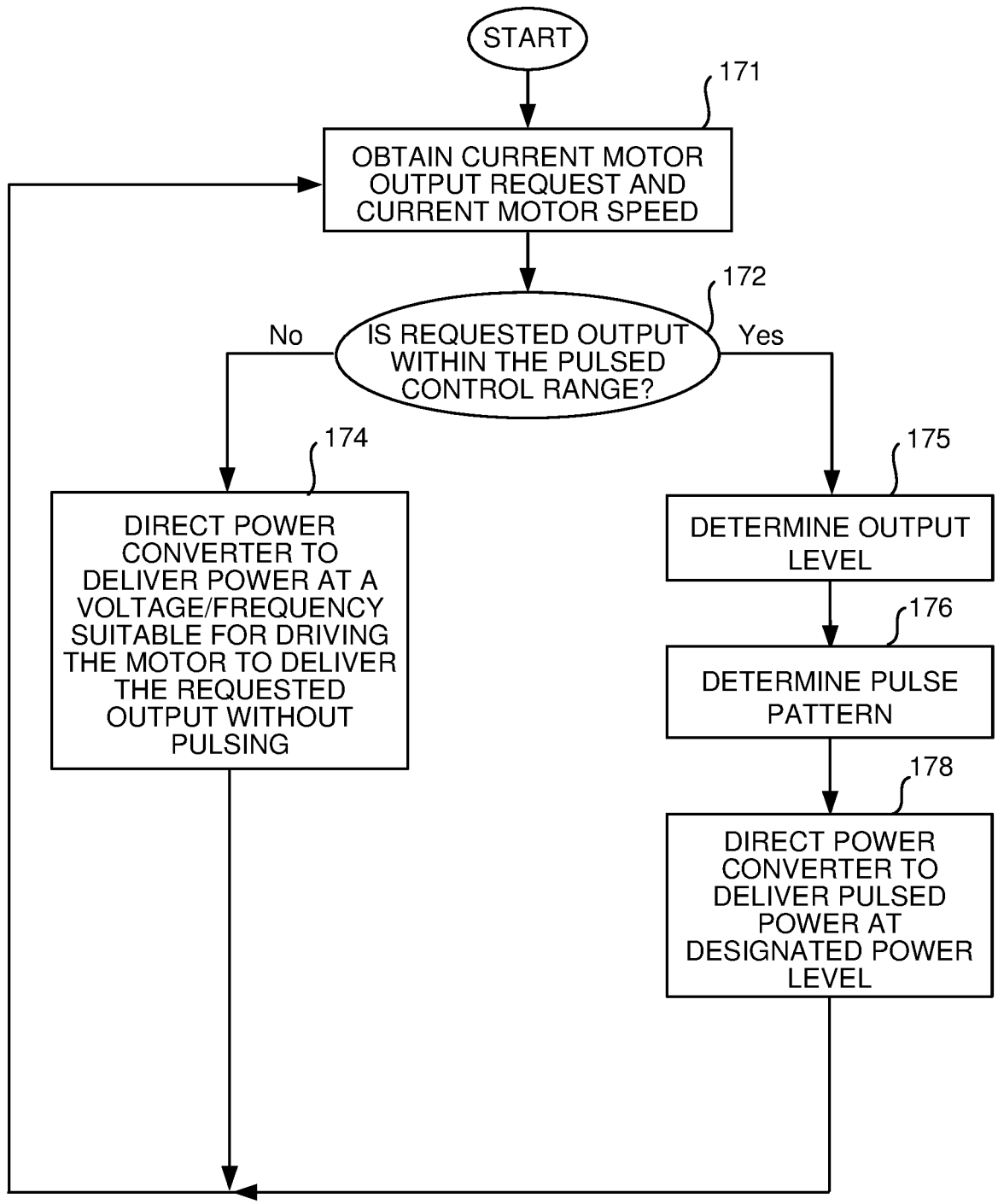
FIG. 4 is a flow chart illustrating a motor control scheme in accordance with some embodiments.

FIG. 4 illustrates a control flow that may be performed by pulse controller 30 to cause the electric machine 52 to efficiently deliver a desired electric machine output as a torque demand. To simplify the discussion, an embodiment in which the electric machine 52 functions as a motor is described. In this arrangement, the power supply/sink 56 acts as a power supply, and the pulse controller 30 functions as a motor controller.

Initially, the pulse controller 30 determines an output demand (torque demand) and any required motor state information such as the current motor speed as represented by block 171. The pulse controller 30 then determines whether the requested desired electric machine output (torque demand) is within the pulse control range as represented by decision block 172. This decision can be made in any desired manner. By way of example, in some embodiments, a look-up table or other suitable data structure can be used to determine whether pulsed control is appropriate. In some implementations, a simple lookup table may identify a maximum efficiency torque level at which pulsed control is appropriate for various motor speeds. The maximum efficiency torque level may be the energy conversion efficient output level. In an embodiment, the maximum efficiency torque level may be a designated output level. In such an implementation, the current motor speed may be used as an index to the lookup table to obtain a maximum efficiency torque level at which the pulsed control is appropriate under the current operating conditions. The designated output level can then be compared to the requested torque to determine whether the requested output is within the pulse control range.

If the requested torque/current operating conditions are outside of the pulsed control range for any reason, then traditional (i.e., continuous/non-pulsed) motor control is used as represented by the "no" branch flowing from the decision block 172. As such, pulsing is not used and the power converter 54 is directed to deliver power to the electric machine 52 at a level suitable for driving the motor to deliver the requested output in a conventional manner as represented by block 174. Conversely, when the requested torque/current operating conditions are within the pulsed control range, then pulsed control is utilized as represented by the "yes" branch flowing from block 172. In such embodiments, the pulse controller 30 will direct the power converter 54 to deliver power to the motor using a pulse pattern. The pulse pattern provides power at a first torque level and a second torque level.

To facilitate pulsed operation, the pulse controller 30 determines the desired output level (block 175). A pulse pattern is determined (block 176) dependent on the current motor speed and desired output level. The pulse controller 30 then directs the power converter 54 to implement the desired pulse pattern at the designated power level. Conceptually, this may be accomplished by modulating the amplitude of the AC power signals.

The pulse controller 30 preferably determines the duty cycle and frequency of the pulse pattern. In some embodiments, the pulsing frequency can be fixed for all operating conditions of the motor, while in others it may vary based on operational conditions such as motor speed, torque requirements, etc. For example, in some embodiments, the pulse pattern and frequency can be determined through the use of a look-up table. In such embodiments, the appropriate pulse pattern and frequency for current motor operating conditions can be looked up using appropriate indices such as motor speed, torque requirement, etc. In other embodiments, the pulse pattern and frequency are not necessarily fixed for any given operating conditions and may vary as dictated by the pulse controller 30. This type of variation is common when using sigma delta conversion in the determination of the pulses.

Although FIG. 4 illustrates some of the steps sequentially to facilitate a clear understanding of the functionality provided, it should be understood that many of the steps can be combined and/or reordered in practice. For example, the entries in a multi-dimensional lookup table that uses requested output and current electric motor speed as indices may indicate both the preferred output level and the duty cycle that is appropriate for the desired operation.

FIG. 4 shows that an electric machine 52 may go from a continuous mode to a pulsed mode and then back to a continuous mode. It has been found that switching from a continuous mode to a pulsed mode and switching from a pulsed mode to a continuous mode causes an increase in noise, vibration, and harshness (NVH). It is believed that a sharp transition from continuous mode to pulse mode or from pulse mode to continuous mode introduces noise across a wide frequency range that may sometimes produce a noticeable driveline "clunk." As a result, various embodiments provide a ramping of one or more of frequency, period, duty cycle, and amplitude when transitioning from continuous mode and pulse mode or from pulse operation mode to continuous operation mode.

Figure 5:
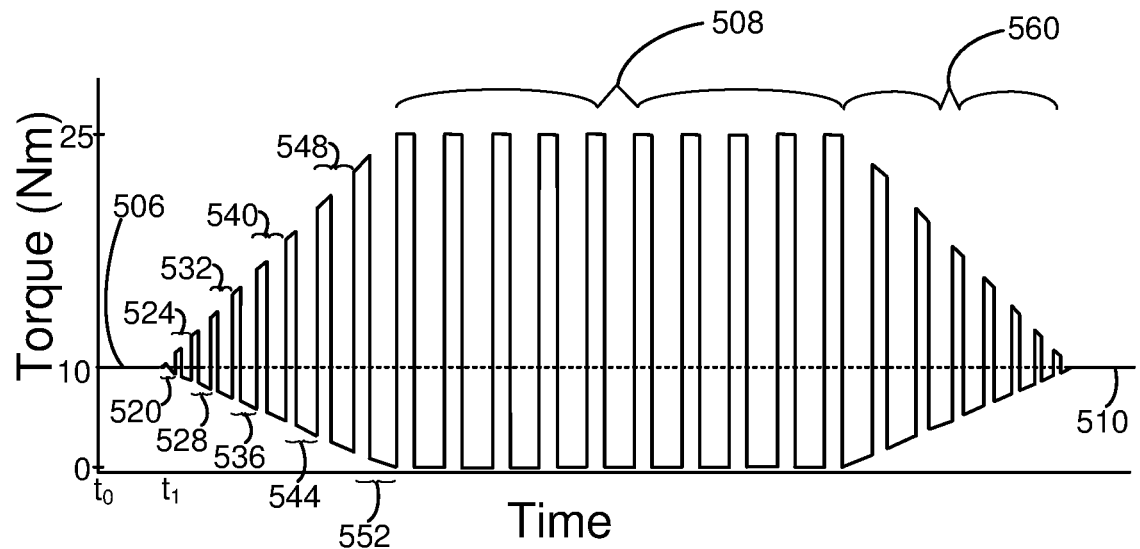
FIG. 5 is a schematic illustration of a ramping that is used in some embodiments.

Various embodiments provide a ramped pulse transition from the continuous mode to the pulsed mode and/or from the pulsed mode to the continuous mode in order to reduce NVH. FIG. 5 is a graph of torque versus time that may be used in some embodiments. In the example of FIG. 5 curve 504, at first, provides a continuous torque 506 of 10 Nm from the period of $t_0$ to $t_1$. In this example, at 10 Nm the system transitions from a continuous torque to a pulsed torque at time $t_1$. In this example, the pulsed mode has about a 40% duty cycle. The region of curve 504 with a constant pulse 508 provides a pulse with a 40% duty cycle, a frequency of 50 Hz, and a period of 20 milliseconds (ms). In addition, the region of the curve 504 with a constant pulse 508 has an amplitude of 25 Nm going from 0 Nm to 25 Nm, where a 40% duty cycle provides an average torque of 10 Nm.

In this example, curve 504 has a first ramping pulse period 520 that has a period of about 6.7 ms and a range of about 9.4 Nm to 11 Nm, with a 40% duty cycle, so that the pulse is at about 11 Nm at about 40% of the time and at about 9.4 Nm at about 60% of the time. As shown in FIG. 5, the torque is constantly changing, so the torques are approximated and the values are provided as examples.

A second ramping pulse period 524 has a period of about 7.3 ms and a range of about 8.6 Nm to 12 Nm with a duty cycle of about 40%. A third ramping pulse period 528 has a period of about 8 ms and a range of about 7.9 to 13.2 Nm. A fourth ramping pulse period 532 has a period of about 9.3 ms and a range of about 7 to 14.5 Nm. A fifth ramping pulse period 536 has a period of about 10.7 ms and a range of about 5.9 to 16.1 Nm. A sixth ramping pulse period 540 has a period of about 12.7 ms and a range of about 4.7 to 17.9 Nm. A seventh ramping pulse period 544 has a period of about 14 ms and a range of about 3.4 to 20 Nm. An eighth ramping pulse period 548 has a period of about 16 ms and a range of about 1.8 to 22.3 Nm. A ninth ramping pulse period 552 has a period of about 18.7 ms and a range of about 0 to 25 Nm.

After the ramping from the continuous torque 506 to the constant pulse 508, a constant pulse 508 is provided. After the constant pulse 508 is provided, a ramping region 560 may be provided that ramps from the constant pulse 508 to a continuous torque 510. In some embodiments, the ramping region 560 from the constant pulse 508 to the continuous torque 501 may be a reverse of the ramping from the continuous torque 506 to the constant pulse 508.

In some embodiments, the torque magnitudes are linearly ramped with respect to time, as shown in FIG. 5. In some embodiments, the duty cycle is unchanged during the ramping, while the frequency, period, and amplitude are ramped. For example, in FIG. 5 the ramp pulse periods increase during the ramping. Some embodiments may have nonlinear ramps. In some embodiments, the ramping may be one or two pulses at a little less than the maximum torque and a little more than the minimum torque of a constant pulse. For example, in some embodiments, the ramp may consist of two pulses with a maximum torque that is between 75% and 95% of the maximum torque of the constant pulse. Some embodiments have a short ramp time since the ramping causes inefficiencies, and shortening the ramp time reduces the inefficiencies. In some embodiments, the frequency of a ramp pulse period may be a multiple of the frequency of the constant pulse 508. For example, if the constant pulse frequency is 20 Hz, then the ramp pulses may have a frequency that is a multiple of 20 Hz. For example, the first ramping pulse may have a frequency of 100 Hz, whereas subsequent ramping pulses provide a ramping from 100 Hz to 20 Hz that are multiples of 20 Hz. In some embodiments, the ramp time for ramping from the continuous torque 506 to the constant pulse 508 may be different from (or not equal to) the ramp time from the constant pulse 508 to the continuous torque 510. For example, the ramp time for ramping from the continuous torque 506 to the constant pulse 508 may be greater than the ramp time from the constant pulse 508 to the continuous torque 510.

There are many possibilities for ramp profiles. In some embodiments, the ramp is at least one of an asymptotic function, quadratic function, or square root function with an initially a steep rise time and then a slower rise time. In some embodiments, for providing a ramped pulses for ramping from the continuous torque to the constant pulse the amplitude of the ramp is monotonically 'non-decreasing'. In some embodiments, providing a ramped pulses for ramping from the constant pulse to the continuous torque, the ramp is monotonically 'non-increasing.' In some embodiments, for ramping from the continuous torque to the constant pulse the amplitude of the ramp is monotonically increasing. In some embodiments, for ramping from the constant pulse to the continuous torque, the ramp is monotonically decreasing.

For ramping region 560, the maximum torques are ramped down and the minimum torques are ramped up to the continuous torque. In some embodiments, the ramping pulse period may decrease during the ramping. In some embodiments frequency and amplitude are ramped over the same duration. In some embodiments, only one of frequency or amplitude is ramped. In some embodiments, both amplitude and frequency are ramped where the ramping has durations that are at least partially not overlapping. In some embodiments, the pulse period may be ramped. In some embodiments, ramping may start from non-zero values. For example, the torque may start or end at a non-zero value. In some embodiments, frequencies are transitioned through values with lower transmissibility over a ramp duration. In some embodiments, the ramping is not continuous so that pulses in frequency ranges that might excite system resonances are excluded from the ramp.

In some embodiments, the ramping is over a time period that is related to a resonant period of a system. In some embodiments, the resonance frequency of a system is less than 20 Hz. In some embodiments, the ramping is between 100 ms to 500 ms long. For systems with fast time constants, the ramping may be over a shorter period. For systems with slow time constants, the ramping may be over a longer period. In some embodiments, the ramping is between 1 microsecond to 2 seconds long. In some embodiments, the time duration of the ramping is about 200 ms. In some embodiments, if the resonance frequency of the system is less than 1 Hz, the resonance period is greater than 1000 ms. In such embodiments, the ramp time would be significantly longer than 1000 ms. In some embodiments, the system resonance frequency is a function of at least one of rotor rotations per minute (RPM), torque, and duty cycle, where lower duty cycles do not shake a vehicle as much. In some embodiments, a fundamental amplitude is dependent on amplitude and duty cycle. In some embodiments, a one dimensional lookup table may use the functional amplitude to specify a multiple of nominal frequency, linear ramp, ramp frequency, amplitude, and/or period.

In some embodiments, an increase in the torque modulation frequency may be used to shift the torque frequency into a frequency range with lower noise vibration harshness (NVH). The ramping provided by some embodiments reduces NVH.

Figure 6:
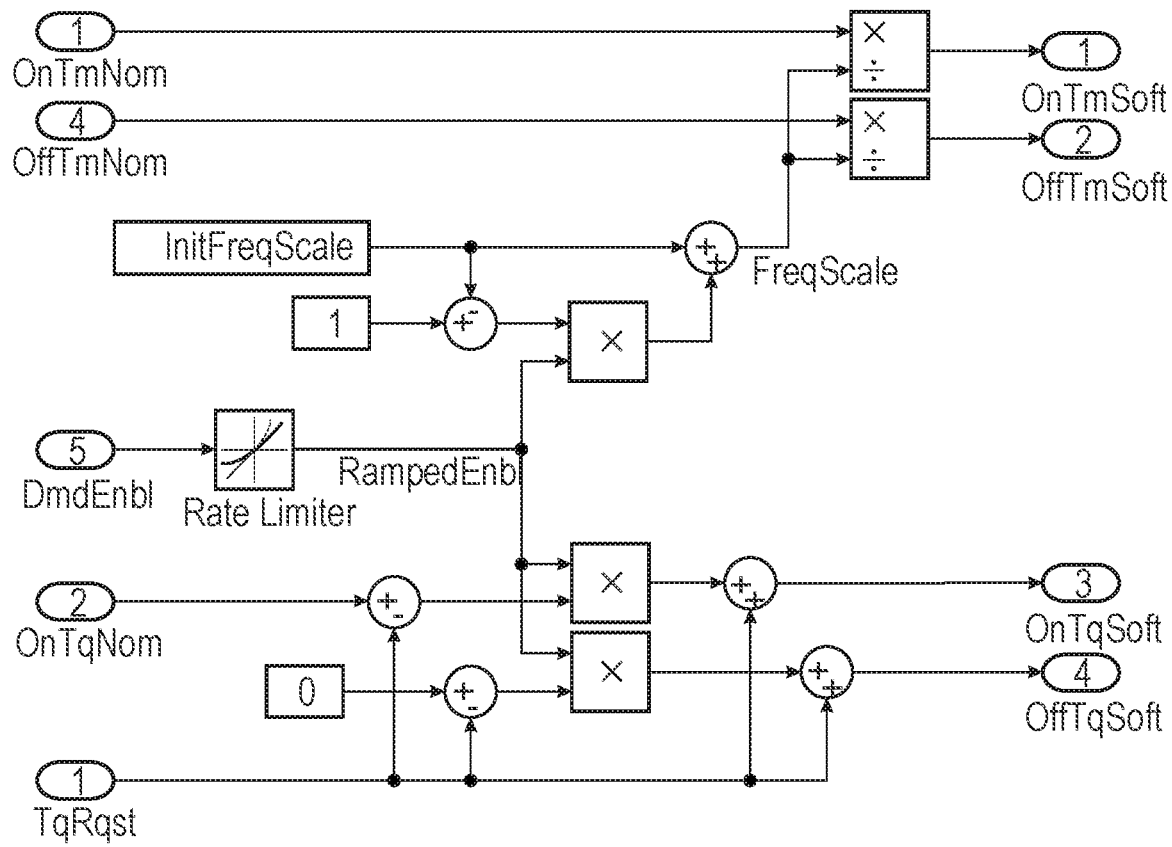
FIG. 6 is a schematic illustration of a ramp generator that may be used in some embodiments.

FIG. 6 is a schematic illustration of a ramp generator that may be used in some embodiments. In some embodiment, when a system goes from a constant torque to a continuous pulse DmdEnbl switches from 0 to 1. RampedEnbl begins increasing linearly from 0 to 1 according to the rising rate specified in the Rate Limiter. In some embodiments, the pulsing amplitude is equal to RampedEnbl, so that the pulsing amplitude starts at zero, i.e. OnTqSoft and OffTqsoft both start at the current value of TqRqst (the constant torque) and then OnTqSoft increases linearly to OnTqNom, while OffTqSoft decreases to zero. FreqScale starts at InitFreqScale, which in some embodiments is greater than 1, and decreases to 1 so that the on/off times are initially reduced but transition to their nominal values. When the system goes from the continuous pulse to the constant torque, the outputs ramp back to the constant torque value according to a falling rate specified by the rate limiter The pulse controller described herein may be implemented in a wide variety of different manners including using software or firmware executed on a processing unit such as a microprocessor, using programmable logic, using application specific integrated circuits (ASICs), using discrete logic, etc., and/or using any combination of the foregoing.

The energy conversion efficiency of power converters will also typically vary over the operating range of the power converter. In some embodiments, when optimizing the control of a generator that is part of a rectifier/generator system, it is desirable to consider the energy conversion efficiency of the overall rectifier/generator system as opposed to the energy conversion efficiency of the generator alone.

Preferably, the pulse control of an electric machine will be modeled to account for the efficiencies of any/all of the components that influence the energy conversion during pulsing. For example, when power for an AC electric motor is drawn from a battery, the battery's power delivery efficiency, cabling losses between components, and any other loss factors can be considered in addition to the converter and motor efficiencies, when determining the motor drive signal that delivers the best energy conversion efficiency.

In general, the overall energy conversion efficiency of a power converter/electric machine system is a function of the product of the converter conversion efficiency times the electric machine conversion efficiency times the delivery efficiency of other components. Thus, it should be appreciated that the parameters of the shaped pulsed drive signal that has the maximum system energy conversion efficiency may be different than the parameters that would provide the best energy conversion efficiency for the motor itself.

In various embodiments, the pulse control may be used in different types of motor control, including AC electric motor control and DC brushless motor control. When an AC induction motor is powered by a battery (which provides DC power) power converter, such as an inverter, may be used to facilitate the conversion of DC power to AC power. In such an embodiment, the amplitude of the AC signal that is generated by the converter may be used to provide the shaped pulse.

In some embodiments, a sigma delta based pulse controller may be used to control the timing of the pulses. As will be appreciated by those familiar with sigma delta control, a characteristic of sigma delta control is that it facilitates noise shaping and tends to reduce/eliminate idle tones and push noise to higher frequencies. When noise is randomized and/or spread to frequencies that are above the limits of human perception, it is less of a concern since any such noise and/or vibration is not bothersome to the users of the motor. Therefore, in the context of an automotive electric motor application, the use of sigma delta control tends to reduce the likelihood of vehicle occupants perceiving noise or vibrations due to the pulsed motor control. Various embodiments may be combined with sigma delta control to further reduce NVH. U.S. Pat. No. 10,742,155, which is incorporated herein by reference in its entirety, describes a number of representative sigma delta converter designs.

Figure 7:
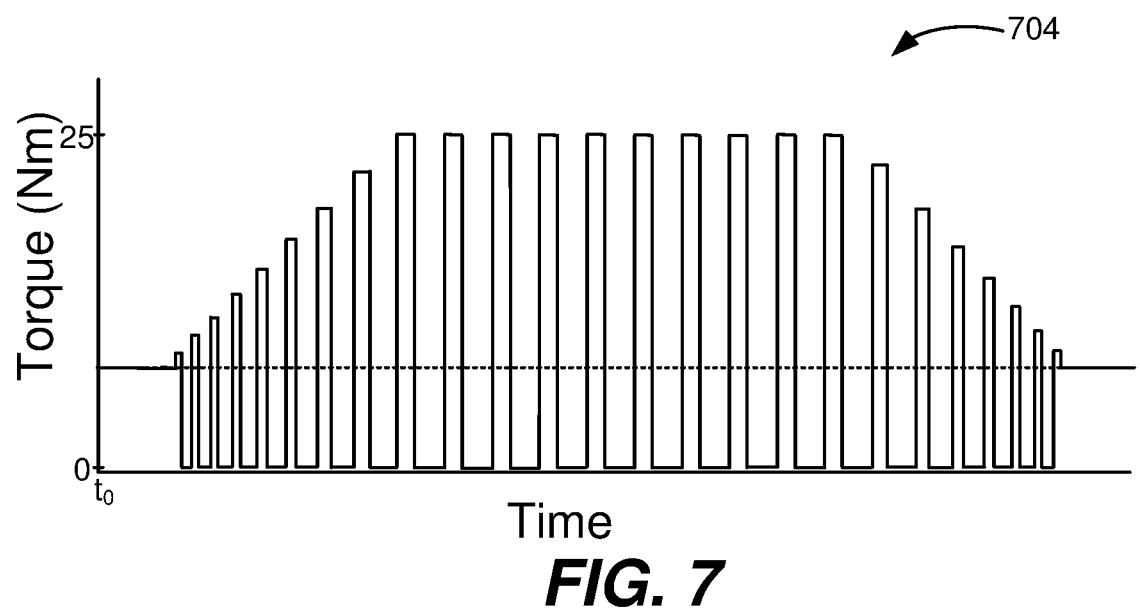
FIG. 7 is another schematic illustration of a ramping that is used in some embodiments.

FIG. 7 is a graph of torque versus time for another ramping that may be used in some embodiments. In the example of FIG. 7, graph 704 provides a ramping where the maximum amplitude is ramped up and then ramped down, but where the minimum of each pulse is constant at 0 torque. In other embodiments, the minimum of each pulse may be constant at a torque not equal to zero. The advantage of this pulsing method is that even in the soft start and end phases, the inverter is able to be shut off during all off pulses. Depending on the motor type, intermittently shutting off the inverter can be a primary source of energy savings for dynamic motor drive.

Motor Types and Applications

It should be apparent from the foregoing description that the described pulsed machine control can be utilized in a wide variety of different applications to improve the energy conversion efficiency of a wide variety of different types of electric motors and generators. These include both AC and DC motors/generators.

A few representative types of electric machines that may benefit from the described pulsing include both asynchronous and synchronous AC electric machines including: Induction machines (IM); switched reluctance machines (SMR); Synchronous Reluctance machines (SynRM); Permanent Magnet Synchronous Reluctance machines (PMaSynRM); Hybrid PMaSynRMs; Externally Excited AC Synchronous machines (SyncAC); Wound field Synchronous machines, Permanent Magnet Synchronous machines (PMSM); Eddy current machines; AC linear machines; AC and DC mechanically commutated machines; axial flux motors; etc. Representative DC electric machines include brushless, electrically excited, permanent magnet, series wound, shunt, brushed, compound, and others. In some embodiments, the electric machine may be a hybrid permanent magnet synchronous reluctance machine.

Although only a few embodiments of the invention have been described in detail, it should be appreciated that the invention may be implemented in many other forms without departing from the spirit or scope of the invention. The variously described pulse controllers and other control elements may be implemented, grouped, and configured in a wide variety of different architectures in different embodiments. For example, in some embodiments, the pulse controller may be incorporated into a motor controller or a converter controller or it may be provided as a separate component. Similarly, for a generator, the pulse controller may be incorporated into a generator controller or a rectifier controller and in combined motor/generators the pulse controller may be incorporated into a combined motor/generator controller or a combined converter/rectifier controller. In some embodiments, the described control functionality may be implemented algorithmically in software or firmware executed on a processor—which may take any suitable form, including, for example, general purpose processors and microprocessors, digital signal processors (DSPs), etc.

The pulse controller may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

In some embodiments, the ramp generator is a physical device separate from the pulse controller. In some embodiments, the ramp generator is a physical device that is part of the pulse controller. In some embodiments, the ramp generator is computer readable code executed by the pulse controller.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure.

What is claimed is:

1. An electric machine controller arranged to direct a power converter to cause a pulsed operation of an electric machine in selected operational ranges to deliver a desired output and to cause a continuous operation of the electric machine in selected operational ranges, wherein the electric machine controller comprises a ramp generator, wherein the ramp generator is adapted to provide a ramping between the pulsed operation that provides a constant pulsed torque and the continuous operation that provides a continuous torque wherein the ramping provides at least two ramped pulses between the constant pulsed torque and the continuous torque, and wherein the at least two ramped pulses have at least one of different frequencies, different periods, and different magnitudes from each other and the constant pulsed torque.

2. The electric machine controller, as recited in claim 1, wherein the ramping is a ramping from the continuous operation to the pulsed operation and from the pulsed operation to the continuous operation.

3. The electric machine controller, as recited in claim 1, wherein the ramping ramps both magnitude and frequency, wherein the at least two ramped pulses have different frequencies and different magnitudes from each other and the constant pulsed torque.

4. The electric machine controller, as recited in claim 1, wherein the ramp generator is adapted to reduce noise, vibration, and harshness when transitioning between pulsed operation and continuous operation.

5. The electric machine controller, as recited in claim 1, wherein the ramping between the continuous operation, the at least two ramped pulses, and the constant pulsed torque is at least one of linear ramping, asymptotic function ramping, quadratic function ramping, and square root function ramping.

6. The electric machine controller, as recited in claim 1, wherein the ramping between the continuous operation, the at least two ramped pulses, and the constant pulsed torque is over a time duration of between 100 ms and 500 ms.

7. The electric machine controller, as recited in claim 1, wherein the ramp generator is adapted to provide the ramping between the pulsed operation and the continuous operation, wherein a time period for ramping from the continuous operation to the pulsed operation is not equal to a time period for ramping from the pulsed operation to the continuous operation.

8. A system comprising:
an electric machine;
a power converter; and
an electric machine controller arranged to direct the power converter to cause a pulsed operation of the electric machine in selected operational ranges to deliver a desired output and to cause a continuous operation of the electric machine in selected operational ranges, wherein the electric machine controller comprises a ramp generator, wherein the ramp generator is adapted to provide a ramping between the pulsed operation that provides a constant pulsed torque and the continuous operation that provides a continuous torque wherein the ramping provides at least two ramped pulses between the constant pulsed torque and the continuous torque, and wherein the at least two ramped pulses have at least one of different frequencies, different periods, and different magnitudes from each other and the constant pulsed torque.

9. The system, as recited in claim 8, wherein the electric machine is a motor, and the power converter includes an inverter.

10. The system, as recited in claim 8, wherein the electric machine is a generator, and the power converter includes a rectifier.

11. The system, as recited in claim 8, wherein the electric machine is configured to operate as a motor/generator.

12. The system, as recited in claim 8, wherein the ramping is a ramping from the continuous operation to the pulsed operation and from the pulsed operation to the continuous operation.

13. The system, as recited in claim 8, wherein the ramping ramps both magnitude and frequency, wherein the at least two ramped pulses have different frequencies and different magnitudes from each other and the constant pulsed torque.

14. The system, as recited in claim 8, wherein the ramp generator is adapted to reduce noise, vibration, and harshness when transitioning between pulsed operation and continuous operation.

15. The system, as recited in claim 8, wherein the ramping between the continuous operation, the at least two ramped pulses, and the constant pulsed torque is at least one of linear ramping, asymptotic function ramping, quadratic function ramping, and square root function ramping.

16. The system, as recited in claim 8, wherein the ramping between the continuous operation, the at least two ramped pulses, and the constant pulsed torque is over a time duration of between 100 ms and 500 ms.

17. The system, as recited in claim 8, wherein the ramp generator is adapted to provide the ramping between the pulsed operation and the continuous operation, wherein a time period for ramping from the continuous operation to the pulsed operation is not equal to a time period for ramping from the pulsed operation to the continuous operation.

18. A method for controlling an electric machine by an electric machine controller arranged to direct a power converter to cause a pulsed operation of the electric machine in selected operational ranges to deliver a desired output and to cause a continuous operation of the electric machine in selected operational ranges, comprising providing ramping between the pulsed operation that provides a constant pulsed torque and the continuous operation that provides a continuous torque wherein the ramping provides at least two ramped pulses between the constant pulsed torque and the continuous torque, and wherein the at least two ramped pulses have at least one of different frequencies, different periods, and different magnitudes from each other and the constant pulsed torque.

19. The method, as recited in claim 18, wherein the providing ramping provides a ramping from the continuous operation to the pulsed operation and from the pulsed operation to the continuous operation.

20. The method, as recited in claim 18, wherein the providing the ramping ramps both magnitude and frequency, wherein the at least two ramped pulses have different frequencies and different magnitudes from each other and the constant pulsed torque.

21. The method, as recited in claim 18, wherein the providing the ramping is adapted to reduce noise, vibration, and harshness when transitioning between pulsed operation and continuous operation.

22. The method, as recited in claim 18, wherein the providing ramping between the continuous operation, the at least two ramped pulses, and the constant pulsed torque provides at least one of linear ramping, asymptotic function ramping, quadratic function ramping, and square root function ramping.

23. The method, as recited in claim 18, wherein the ramping between the continuous operation, the at least two ramped pulses, and the constant pulsed torque is over a time duration of between 100 ms and 500 ms.

24. The method, as recited in claim 18, wherein a time period for ramping from the continuous operation to the pulsed operation is not equal to a time period for ramping from the pulsed operation to the continuous operation.

* * * * *